Patented July 25, 1950

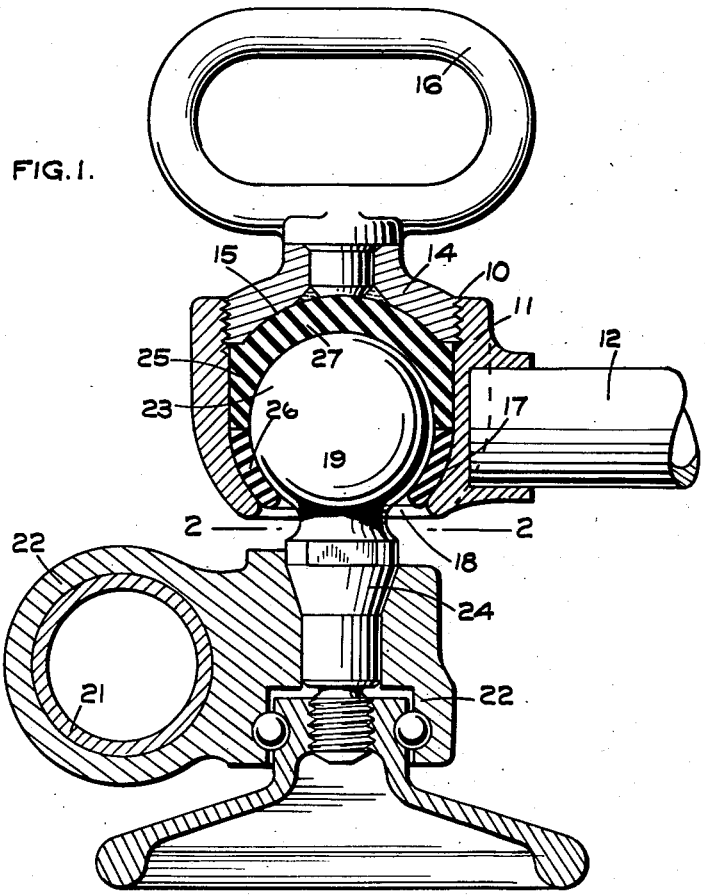
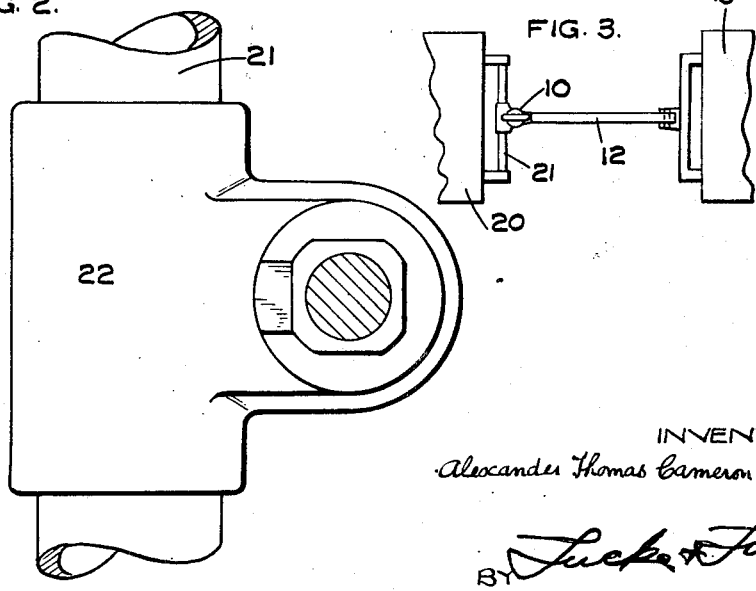

2,516,555

UNITED STATES PATENT OFFICE 2,516,555

COUPLING FOR VEHICLES

Alexander Thomas Cameron Dear, West Bromwich, England, assignor to J. Brockhouse & Company Limited, West Bromwich, England, a British company Application February 20, 1948, Serial No. 9,773
In Great Britain January 1, 1947

Section 1, Public Law 690, August 8, 1946
Patent expires January 1, 1967

4 Claims. (Cl. 280—33.17)

This invention relates to couplings for connecting two vehicles together and of the kind comprising co-operating ball and socket members mounted or adapted to be mounted each on one of the vehicles, two forms of coupling of this kind being described in our British patent specifications Nos. 374,065 and 410,095.

In couplings of the above kind the co-operating ball and socket members permit of a limited universal movement between the two vehicles and hitherto as is described, for instance, in the said specifications, it has been the usual practice for the ball member to engage directly with the interior of the socket member which has been shaped to correspond with the shape of the ball so as to permit of the desired relative movement. Consequently accurate fabrication of the interengaging surface of the ball and socket member has hitherto been necessary and in order to prevent rattle between the two members during use only a limited clearance has been permissible between the interengaging surfaces so that the fabrication has to be carried out working to very limited tolerances with the result that the coupling is relatively expensive and its production is a relatively skilled operation. A construction is, however, known in which the socket member has been made in two hemispherical parts hinged together and rubber lined, the parts having bevelled meeting surfaces and being secured together by means of a yoke pivoted to one part and having a screw which engages with the exterior of the other part when the two parts are assembled with the ball in position therebetween.

The object of the present invention is to provide an improved construction in which not only is an elastic deformable member such as rubber interposed between the ball and socket members, but wide manufacturing tolerances are permitted in the fabrication of the opposed surfaces of the ball and socket members and in which any clearances present consequent on the working of such tolerances can be taken up when the ball is enclosed and fully positioned within its socket.

Referring to the drawings—

Figure 1 is a cross sectional side view of one form of a vehicle coupling constructed in accordance with the present invention.

Figure 2 is a sectional view on the line 2—2 of Figure 1.

Figure 3 is a diagrammatic plan view showing the coupling in position and connecting a tractor vehicle to a trailer vehicle.

Referring to the drawings, the coupling illustrated comprises a socket member 10 made in two parts namely a substantially circular tubular part 11 mounted on the forward end of a draw bar 12 connected to the front end of the trailer vehicle 13 so that it extends longitudinally thereof, the tubular part 11 of the socket member being disposed with its longitudinal axis vertical and having its upper end threaded internally to receive the other part 14 of the socket member, which other part is constructed in the form of a plug of circular part spherical form having an inner part spherical surface 15, and provided with an upwardly extending operating handle 16 of elongated configuration so that the fingers of the user can conveniently be inserted through it.

The lower end of the tubular part 11 of the socket member is also of part spherical form on its inner side as indicated at 17 so that this part tapers inwardly in a downward direction, the part terminating in a circular hole 18. The remainder of the tubular socket part 11 is of cylindrical form internally as shown, the junction between the cylindrical and the part spherical surfaces being situated on the longitudinal centre line of the draw bar.

The tractor vehicle which is indicated at 20 is provided at its rear end with a horizontal transverse tube 21, opposite ends of which are secured rigidly to the rear end of the vehicle, the tube intermediate its ends carrying an attachment member 22 constructed as described in our specification No. 9,774, filed February 20, 1948. The ball member 19 includes a ball portion 23 having an integral depending shank 24 which is secured detachably to the attachment member 22 in the manner described in our said specification of even date, and the arrangement is such that when the various parts are in position the shank is disposed substantially vertical when the vehicles are on level ground, the shank extending substantially at right angles to the length of the horizontal draw bar 12.

The ball shank extends through the hole 18 in the lower part of the socket member 10 and is made of a diameter appreciably less than the diameter of this hole so that the ball can have limited universal movement relative to the socket.

The radius of the ball portion 23 is made substantially less than the radius of the part spherical surfaces of the socket member 10 and in between these two opposed surfaces is interposed an elastic deformable member 25 made of rubber.

To facilitate assembly of the parts, the deformable member 25 is made in two sections namely a sleeve 26 having part spherical inner and outer surfaces, which sleeve is disposed immediately beneath the longitudinal centre line of the draw bar 12, and a hemispherical or cup like section 27 which is disposed immediately above this centre line, although if desired the deformable member may comprise a single section having a configuration corresponding to that of the two sections illustrated, which single section is forced over the ball 23 prior to assembly of the coupling.

The coupling is conveniently assembled by first disposing the sleeve like section 26 in the lower portion of the tubular socket part 11, passing the shank of the ball member downwardly through this socket part and sleeve like section therein so that the shank projects through the openings in the lower end of the sleeve and through the hole 18, the hemispherical section 27 is then placed in the upper portion of the tubular part 11 so that its lower edge is horizontal and engages with the horizontal upper edge of the sleeve like section 26. Finally the plug 14 is screwed into position so as to apply pressure to the deformable rubber member 25 and to maintain it in tight engagement with the opposed surfaces of the ball and socket members.

The plug may be further screwed so as to apply additional pressure to the deformable member as may be required from time to time after a period of use to take up any wear which may have occurred in the surface of the deformable member or to compensate for any change in thickness thereof, said adjustment being made with the ball completely in position within the socket.

The hemispherical rubber section 27 is conveniently shaped on its exterior to engage closely with both parts of the socket member, i. e. the lower portion of its exterior is of cylindrical form and the upper portion is of part-spherical form.

Instead of making the deformable rubber member 25 in two sections it may be formed in a single piece and forced over the ball before the parts are assembled.

With this arrangement the rubber member may be bonded to the socket or to the ball.

The shape of the parts is conveniently such that when the coupling is assembled the centre line of the ball 23 lies along the longitudinal centre line of the draw bar 12.

A coupling in accordance with the present invention possesses the great advantage that accurate machining or other fabrication of the opposed surfaces of the ball and socket members is unnecessary, wide manufacturing tolerances being permitted as the elastic and deformable nature of the member interposed between these surfaces compensates for any manufacturing variations in the shape and sizes of the opposed surfaces particularly when the deformable member is subject to a compressive force after the parts have been assembled in the manner already described. At the same time the deformable member does not interfere with the desired universal movement between the ball and socket members although owing to its elasticity it serves to damp out sudden violent relative movements thereby avoiding undue sudden strains being placed upon the coupling during use.

Furthermore the provision of the deformable member ensures complete absence of rattle between the ball and socket members when the parts are assembled.

In addition ample bearing surface is provided between the deformable member and the opposed surfaces of the ball and socket members when the parts are assembled.

What I claim then is:

1. A coupling for connecting two vehicles together comprising in combination ball and socket coupling members adapted each for mounting on one of the vehicles to be connected, said socket member comprising a tubular part having an opening at each end thereof and mounted on one of the vehicles to be connected and a plug threadably mounted in the opening at one end of said tubular support, said ball member having a diameter less than that of said last mentioned opening and greater than that of the other opening in said tubular part and being disposed within said tubular part, a shank on said ball member extending through said other opening in said tubular part, said ball member having a diameter less than the internal diameter of the socket member, an elastic deformable member disposed between the opposed surfaces of the ball and socket members in close engagement therewith and means for rotating said plug relative to said tubular part to apply pressure to said deformable member so as to take up any clearance between said member and the opposed surfaces of the ball and socket members, and means for detachably connecting one of said coupling members to its associated vehicle so that the vehicles can be coupled together and uncoupled without separation of the ball and socket members of the coupling.

2. A coupling for connecting two vehicles together comprising in combination ball and socket coupling members adapted each for mounting on one of the vehicles to be connected, said socket member comprising a tubular part having an opening at each end thereof and mounted on one of the vehicles to be connected and a plug threadably mounted in the opening at one end of said tubular support, said plug having a diameter greater than the diameter of said ball, said ball member being disposed within said tubular part and symmetrically relative to said plug, a shank on said ball extending through the opening at the other end of said tubular part, said other end of said tubular part being shaped to retain said ball member therein, said ball member having a diameter less than the internal diameter of the socket member, an elastic deformable member disposed between the opposed surfaces of the ball and socket members in close engagement therewith, said plug having a part-spherical surface adapted to engage with said elastic deformable member, means for rotating said plug relative to said tubular part to apply pressure to said deformable member so as to take up any clearance between said member and the opposed surfaces of the ball and socket members and means detachably connecting said ball shank to its associated vehicle so that the vehicles can be coupled together and uncoupled without separation of the ball and socket members of the coupling.

3. A coupling for connecting two vehicles together comprising in combination ball and socket coupling members, attachment members connecting each of said coupling members to one of the vehicles to be connected, said socket member comprising a tubular part having an opening at each end thereof and mounted on one of the vehicles to be connected and a plug threadably mounted in the opening at one end of said tubular support, said ball member having a diameter less than that of said last mentioned opening and greater than that of the other opening in said tubular part and being disposed within said tubular part, a shank on said ball member extending through said other opening in said tubular part, said ball member having a diameter less than the internal diameter of the socket member, an elastic deformable member disposed between the opposed surfaces of the ball and socket members in close engagement therewith, means for rotating said plug relative to said tubular part to apply pressure to said deformable member so as to take up any clearance between said member and the opposed surfaces of the ball and socket members, and means detachably connecting said ball member shank to its associated vehicle so that the vehicles can be coupled together and uncoupled without separation of the ball and socket members of the coupling.

4. A coupling for connecting two vehicles together comprising in combination ball and socket coupling members, attachment members connecting each of said coupling members to one of the vehicles to be connected, said socket member comprising a tubular part having an opening at each end thereof and mounted on one of the vehicles to be connected and a plug threadably mounted in the opening at one end of said tubular support, said plug having a diameter greater than the diameter of said ball, said ball member being disposed within said tubular part and symmetrically relative to said plug, a shank on said ball extending through the opening at the other end of said tubular part, said other end of said tubular part being shaped to retain said ball member therein, said ball member having a diameter less than the internal diameter of the socket member, an elastic deformable member disposed between the opposed surfaces of the ball and socket members in close engagement therewith, said plug having a part-spherical surface adapted to engage with said elastic deformable member, an operating handle of loop-like form for rotating said plug relative to said tubular part to apply pressure to said deformable member so as to take up any clearance between said member and the opposed surfaces of the ball and socket members, and means detachably connecting said ball member shank to its associated vehicle so that the vehicles can be coupled together and uncoupled without separation of the ball and socket members of the coupling.

ALEXANDER THOMAS CAMERON DEAR.

REFERENCES CITED

The following references are of record in the file of this patent:

UNITED STATES PATENTS

| Number | Name | Date |
| --- | --- | --- |
| 2,297,182 | Weiss | Sept. 29, 1942 |

FOREIGN PATENTS

| Number | Country | Date |
| --- | --- | --- |
| 42,628 | France | Aug. 23, 1933 |
| 582,942 | Germany | Aug. 25, 1933 |
| 751,203 | France | Aug. 29, 1933 |